United States Patent [19]

Rorden

[11] Patent Number: 5,206,870
[45] Date of Patent: Apr. 27, 1993

[54] LASER CATHODE VOLTAGE CONTROLLER

[75] Inventor: Robert J. Rorden, Los Altos, Calif.
[73] Assignee: Coherent, Inc., Palo Alto, Calif.
[21] Appl. No.: 775,812
[22] Filed: Oct. 11, 1991
[51] Int. Cl.$^5$ ............................................... H01S 3/10
[52] U.S. Cl. ........................................ 372/25; 372/38
[58] Field of Search ....................... 372/25, 38, 81, 82, 372/85

[56] References Cited

U.S. PATENT DOCUMENTS 4,308,507 12/1981 Pleasance et al. ..................... 372/82

Primary Examiner—John D. Lee
Assistant Examiner—Robert E. Wise
Attorney, Agent, or Firm—Limbach & Limbach

[57] ABSTRACT

A voltage controller for converting AC line voltage (which may fluctuate, or vary from site to site) to AC power (having substantially constant average power) for a laser tube cathode heater. The voltage controller of the invention receives standard AC line voltage and a feedback signal proportional to the voltage applied to the cathode of a laser gas tube by the cathode heater. In a preferred embodiment, the feedback signal is processed to generate a DC signal representing time-averaged power applied to the cathode. Preferably, the DC signal is then compared with a preset reference voltage in a comparator, and the comparator output is fed to the data input of a flip flop circuit. A clock signal derived from the AC line voltage is supplied to the clock input of the flip flop. The flip-flop will thus respond to the comparator output once per line cycle (approximately at a zero crossing). The flip-flop output is employed to control a solid state switch, which turns power to the cathode heater on or off for full line cycle intervals. In response to variations in the line voltage, the ratio of "on" to "off" cycles will change to maintain substantially constant average power to the cathode heater. The control technique employed in the inventive apparatus avoids switching transients and DC current in the cathode heater's transformer primary.

14 Claims, 6 Drawing Sheets

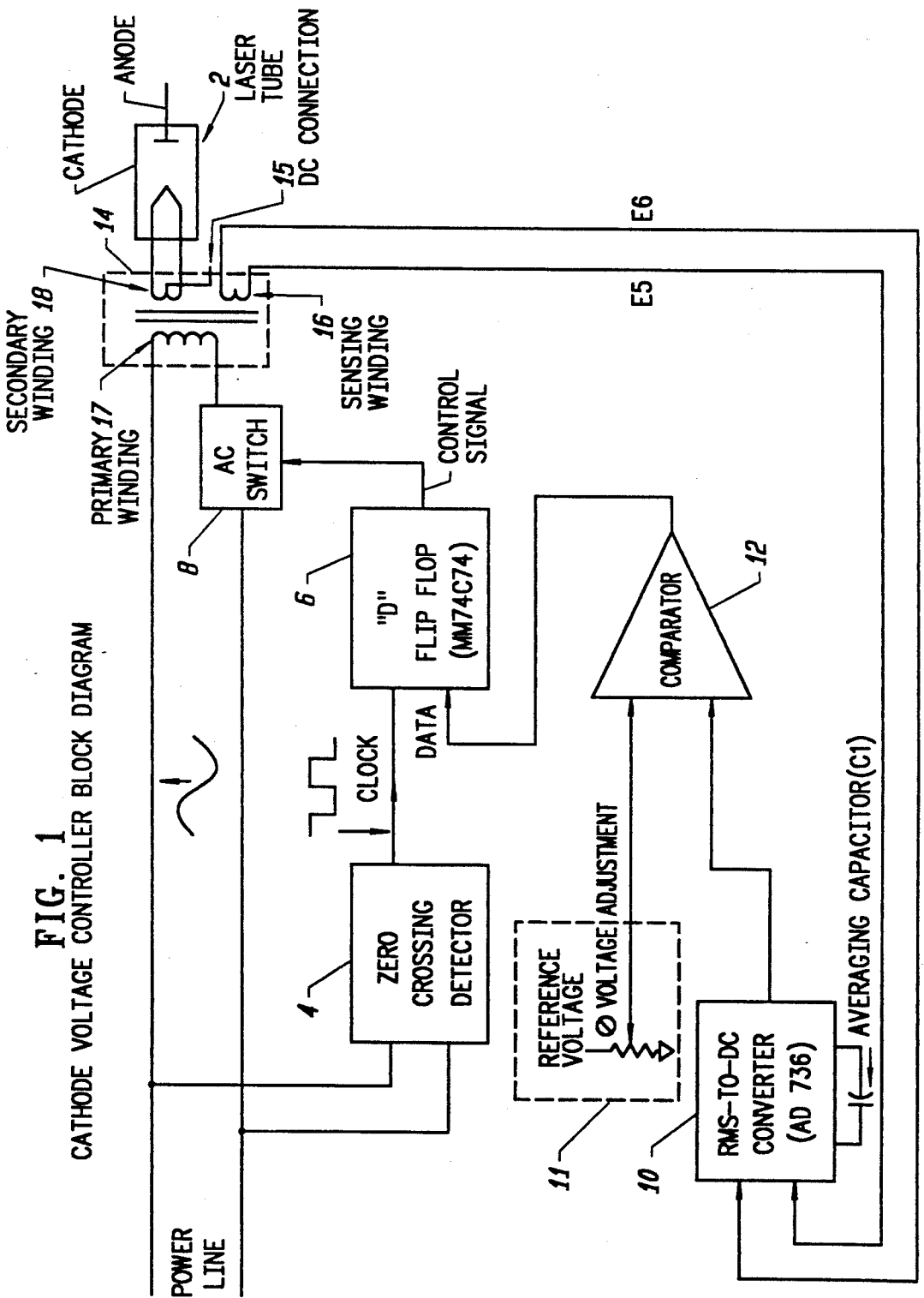

LASER CATHODE VOLTAGE CONTROLLER

FIELD OF THE INVENTION

The invention relates to circuitry for supplying AC power to a laser tube cathode heater. More particularly, the invention relates to circuitry for converting AC line voltage (which may fluctuate, or vary from site to site) to substantially constant average AC power for a laser tube cathode heater.

BACKGROUND OF THE INVENTION

Typical ion lasers include a laser gas tube enclosing a cathode and an anode, and a laser tube cathode heater for heating the cathode. For example, FIG. 1 shows conventional laser gas tube 2, whose cathode is heated by laser tube cathode heater 14. Cathode heater 14 of FIG. 1 comprises a transformer whose primary winding 17 is connected to an AC power source, and whose secondary winding 18 supplies a lower AC voltage (typically 2.5 VAC, at 25 amps) to the cathode of tube 2. DC voltage can be applied to secondary winding 18 through DC connection line 15.

Cathode heater 14 shown in FIG. 1 is a conventional cathode heater, except that includes an additional sensing winding 16 (to be discussed below) for generating a signal proportional to the voltage induced on winding 18 by primary winding 17.

Thermionic cathodes such as those used in ion lasers should be operated at a temperature specified by the manufacturer for proper operation and long service life. Typically, a cathode is tested in an evacuated bell jar using an optical pyrometer, to adjust the temperature to an optimal value. The optimal heater voltage and current associated with the optimal temperature are measured. In operation, the heater voltage and current applied the cathode are adjusted to their optimal values, typically by selecting taps on a suitable transformer.

This adjustment is limited to coarse steps, and unless a ferroresonant filament transformer is used, the taps should be adjusted in the field (at the user's site) in accordance with the user's line voltage.

The present invention generates substantially constant average (nonfluctuating) AC power for a laser tube cathode heater, in a manner so that the AC power is continuously adjustable (rather than adjustable merely in coarse steps). The invention eliminates the effect of line voltage variation in the field.

SUMMARY OF THE INVENTION

The inventive laser tube cathode heater voltage controller includes circuitry for converting AC line voltage (which may fluctuate, or vary from site to site) to AC power (having substantially constant average power) for a laser tube cathode heater.

The invention receives standard AC line voltage (i.e., sinusoidal power having an RMS voltage of 120 volts, from a standard wall outlet), and a feedback signal proportional to the voltage induced on the cathode by the cathode heater.

In a preferred embodiment, the feedback signal is processed (in an RMS-to-DC converter connected to an integrating capacitor) to generate a DC signal representing time-averaged power applied to the cathode. The DC signal is then compared with a preset reference voltage in a comparator, and the output of the comparator is fed to the data input of a "D"-type flip flop circuit. A clock signal derived from the AC line voltage is supplied to the clock input of the flip flop, so that the flip-flop will respond to the comparator output once per line cycle (approximately at a zero crossing).

The flip-flop output is employed to control a solid state switch, which turns power to the cathode heater on or off for full line cycle intervals. In response to variations in the line voltage, the ratio of "on" to "off" cycles will change to maintain substantially constant average power to the cathode heater.

The control technique employed in the inventive apparatus avoids switching transients and DC current in the cathode heater's transformer primary.

BRIEF DESCRIPTION OF THE DRAWINGS

FIG. 1 is a block diagram of a preferred embodiment of the invention.

DETAILED DESCRIPTION OF THE PREFERRED EMBODIMENTS

Figure 2A:
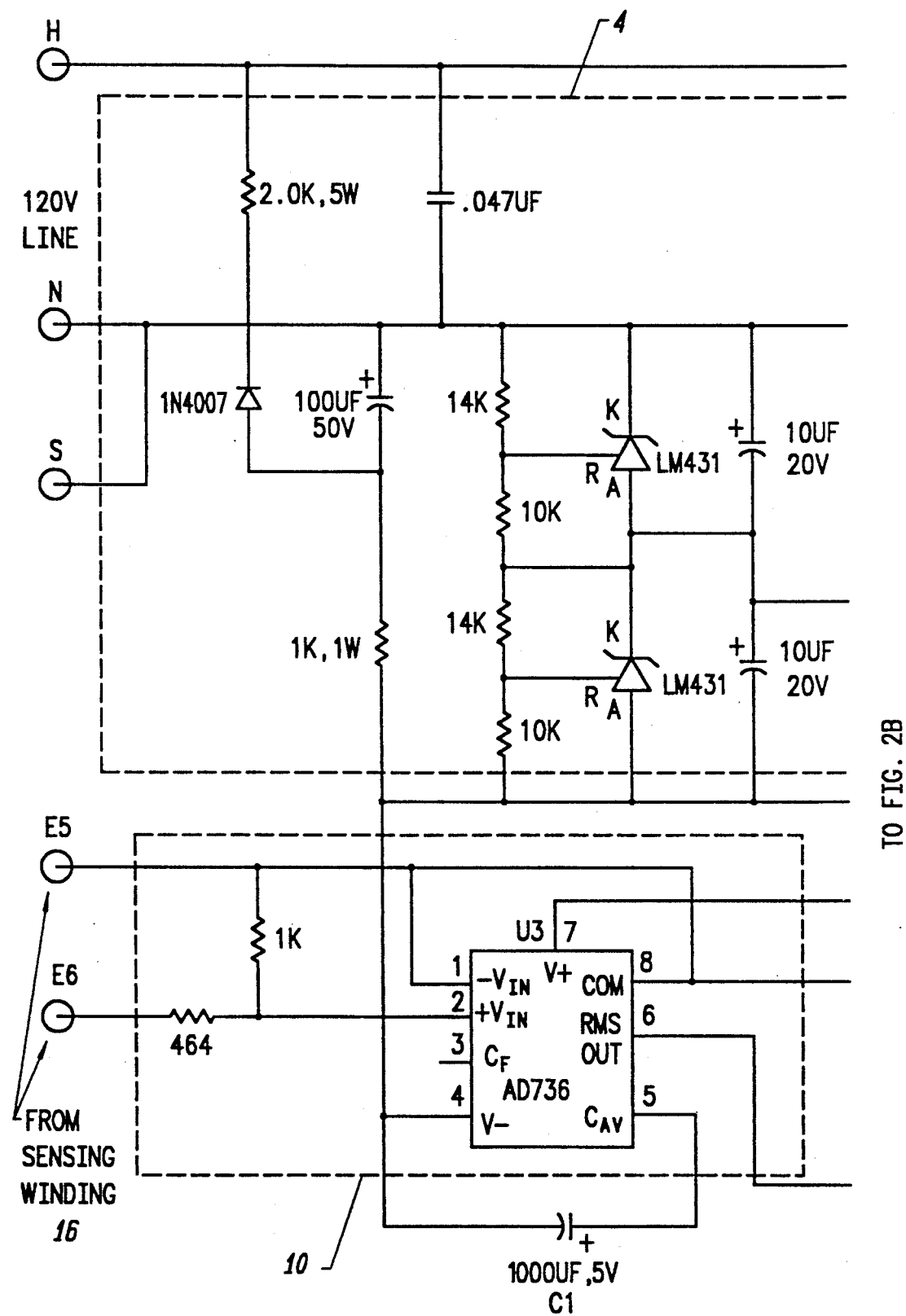
FIGS. 2A, 2B, 2C, 2D, and 2E are a schematic diagram of a preferred implementation of the FIG. 1 circuit.
Figure 2B:
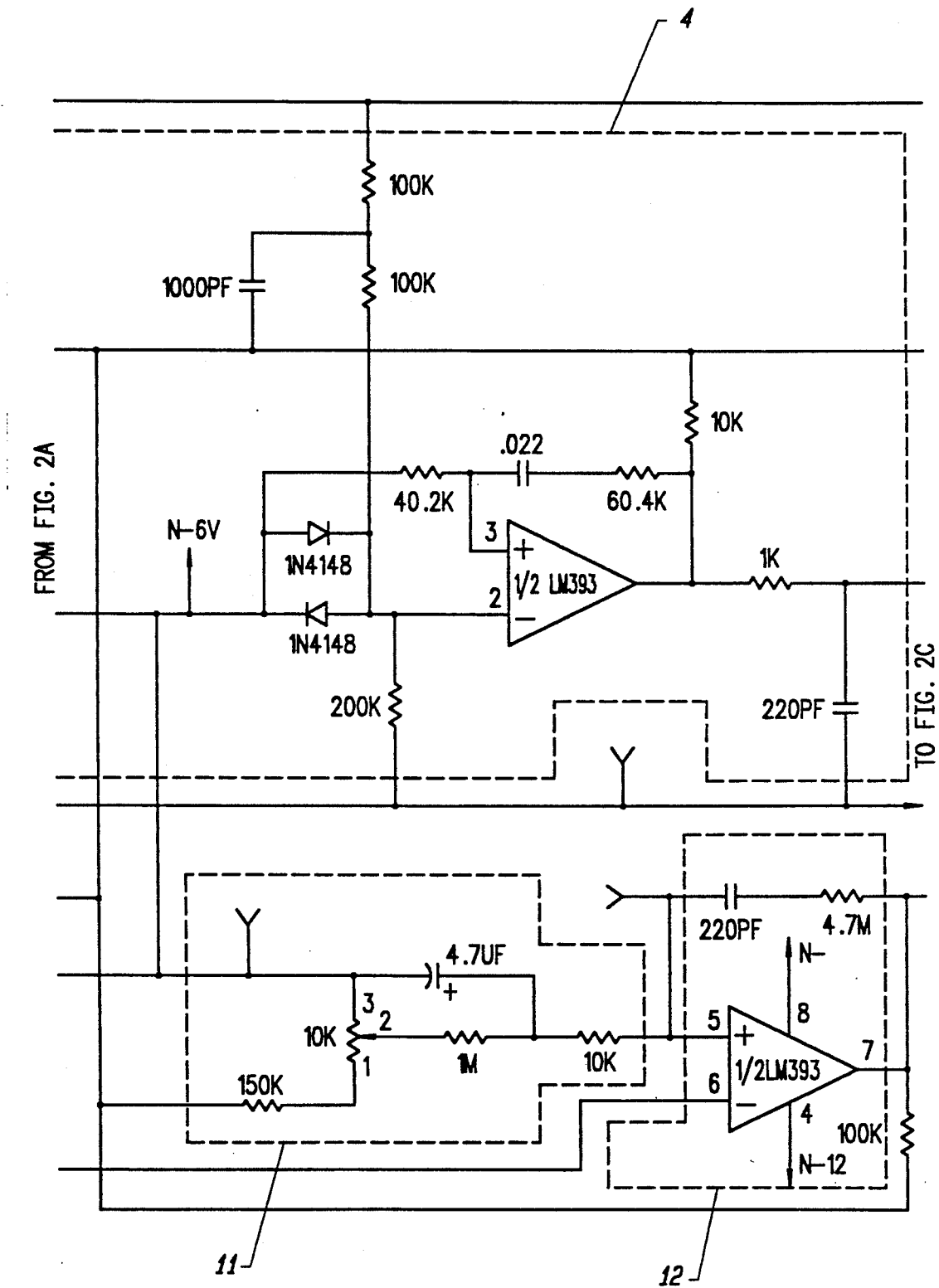
Figure 2C:
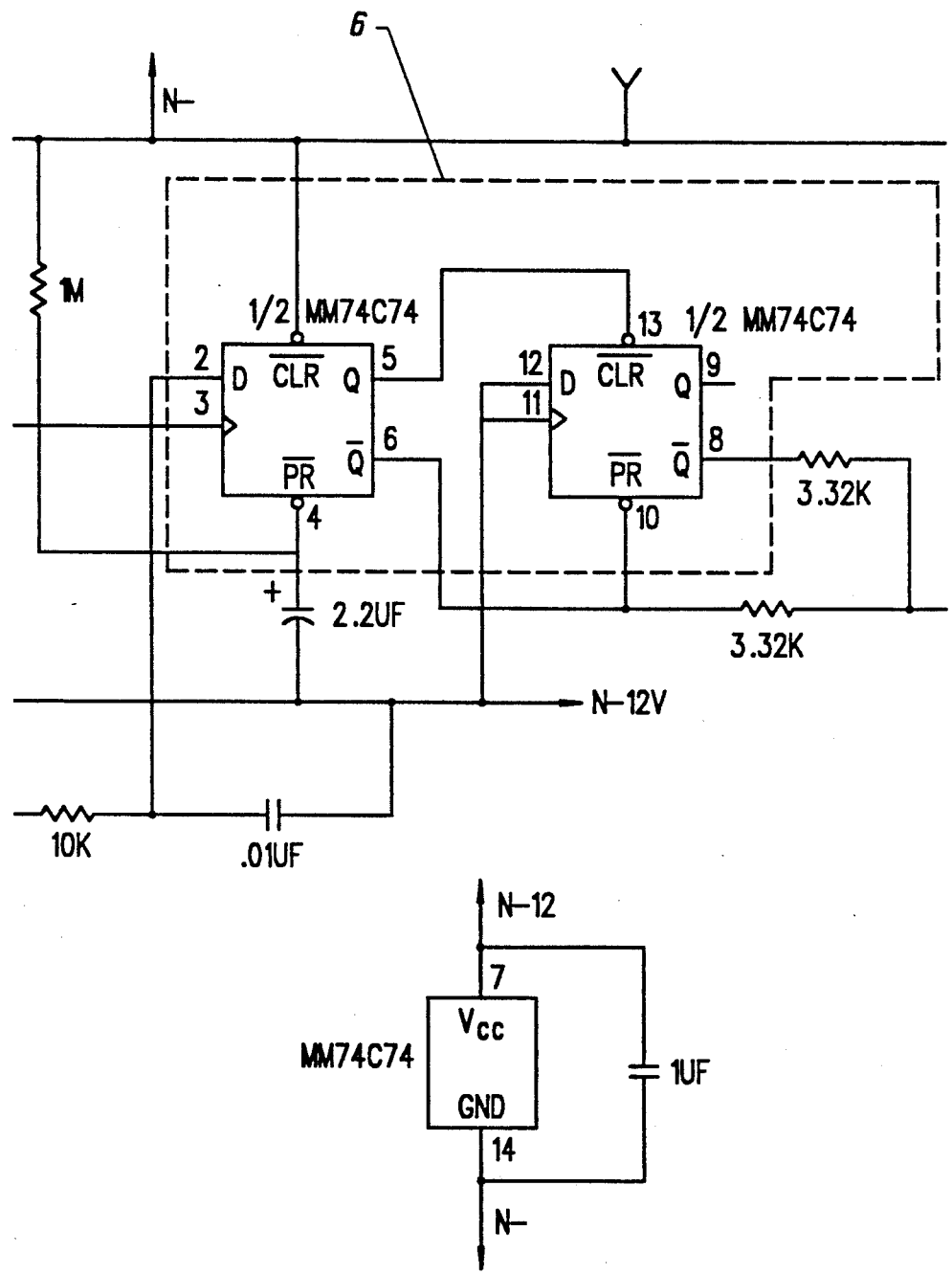
Figure 2D:
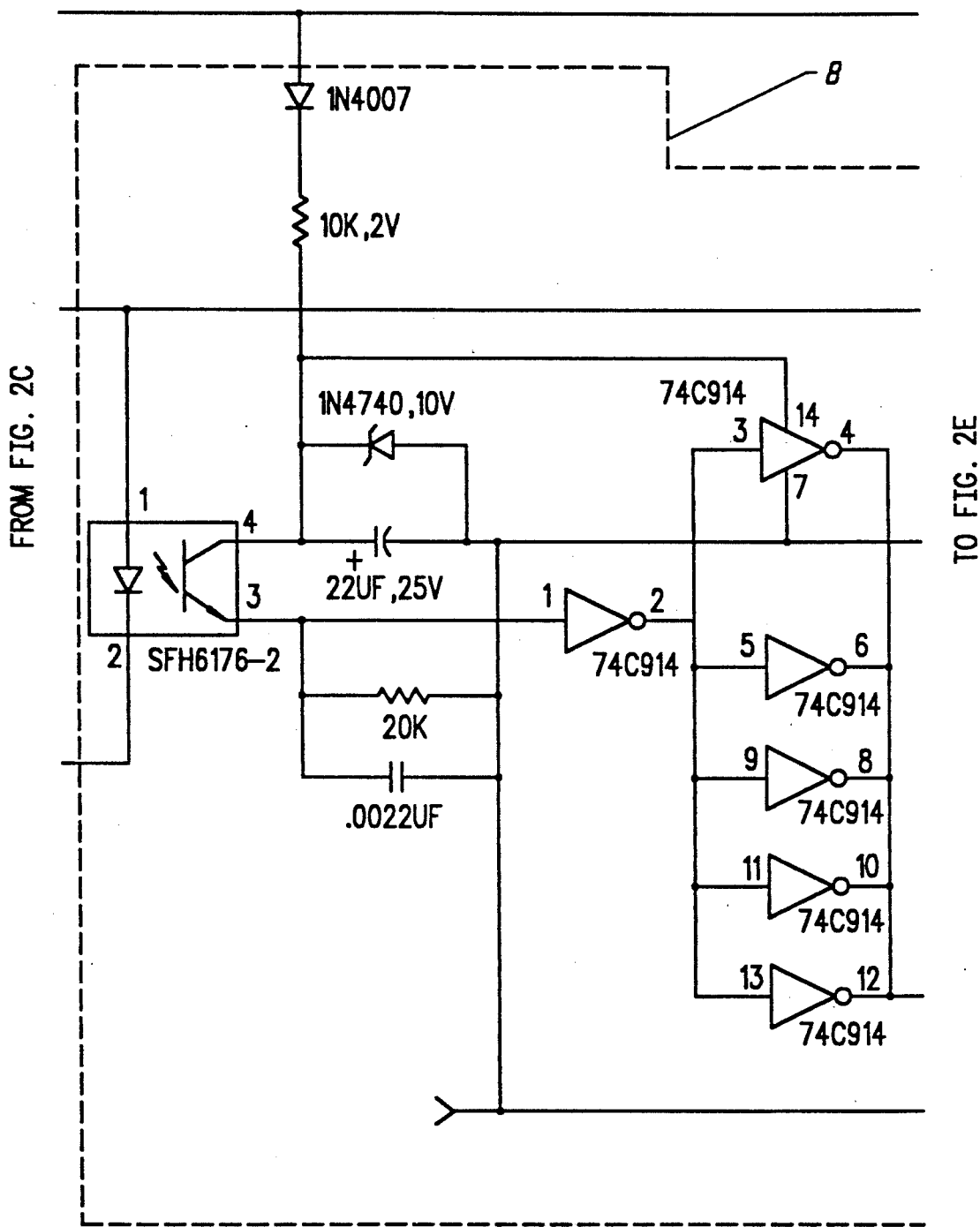
Figure 2E:
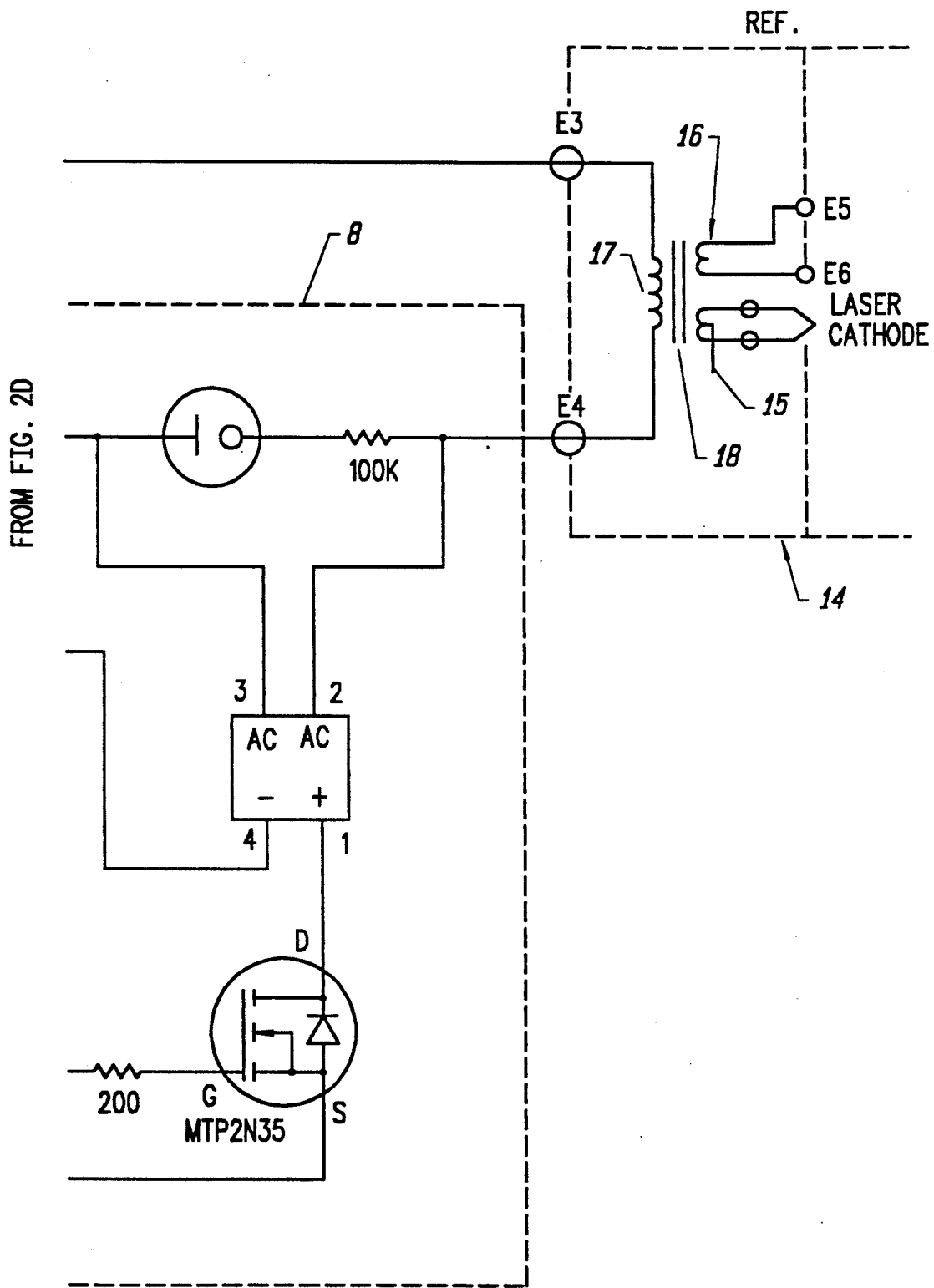

A preferred embodiment of the system of the invention will be described with reference to FIGS. 1 and 2. Each power supply circuit element of FIG. 1 corresponds to an identically numbered portion of the FIG. 2 circuit. FIG. 2 represents a preferred implementation of the circuit of FIG. 1.

Laser tube 2 (which can be a ceramic/tungsten argon laser tube) has its cathode connected to secondary winding 18 of cathode heater transformer 14. Typically, secondary winding 18 supplies AC power to the cathode of tube 2 having an RMS voltage of 2.5 volts (and an RMS current of 25 amps). AC line power (e.g., standard AC line power having an RMS voltage of 120 volts, in the FIG. 2 embodiment) is supplied through AC switch 8 to transformer 14's primary winding 17.

Primary winding 17 induces a voltage in sensing winding 16 of cathode heater transformer 14, as well as in secondary winding 18. Sensing winding 16 asserts a feedback signal (proportional to the voltage induced in secondary winding 18 by primary winding 17) to RMS-to-DC conversion circuit 10. A large integrating capacitor C1 is connected across circuit 10. Preferably, circuit 10 is a conventional, commercially available RMS-to-DC converter (such as an AD736 integrated circuit available from Analog Devices), and capacitor C1 is a 1000 microfarad capacitor.

The function of circuit 10 (with integrating capacitor C1) is to generate a DC signal having amplitude proportional to the time-averaged power applied to the cathode (i.e., the running average, over several seconds, of the power supplied to winding 16). Circuit 10 asserts this DC signal to a first input of comparator 12.

The other input of comparator 12 receives a preset reference voltage from circuit 11. The reference voltage is preferably a DC voltage set by a manually adjusted potentiometer.

Comparator 12 compares the preset reference voltage with the output of RMS-to-DC circuit 10, and the output of comparator 12 is fed to the "data" input of "D"-type flip flop circuit 6 (which can consist of a commercially available MM 74C74 integrated circuit, or two such MM 74C74 circuits connected as shown in FIG. 2).

Zero crossing detector circuit 4 receives the AC line voltage and generates therefrom a clock signal having the same frequency as the AC line voltage. Circuit 4 applies this clock signal to the clock input of flip flop circuit 6. Thus (while its clear and preset terminals are held "high"), flip-flop circuit 6 will generate an output signal (at its "inverse Q" terminal) which is the inverse of the digital signal output from comparator 12, and this output signal is updated once per line cycle (at each low voltage-to-high voltage transition of the clock signal).

The output signal from flip-flop circuit 6 is employed to control solid state AC switch 8. Switch 8 asserts ("turns on") power to heater transformer 14 for a full line cycle interval each time the output of circuit 6 reflects that the reference voltage (from circuit 11) exceeds the feedback voltage (from sensing winding 18). Switch 8 disconnects ("turns OFF") the line power from heater transformer 14 for a full line cycle interval each time the output of circuit 6 reflects that the feedback voltage (from sensing winding 18) exceeds the reference voltage (from circuit 11). Thus, in response to variations in line voltage amplitude, the ratio of "on" to "off" cycles will change to maintain substantially constant average power supply to heater transformer 14.

The control technique employed in the apparatus of FIGS. 1 and 2 avoids switching transients, and also avoids DC current in primary winding 17 of heater transformer 14.

Various modifications and alterations in the structure and method of operation of this invention will be apparent to those skilled in the art without departing from the scope and spirit of this invention. Although the invention has been described in connection with specific preferred embodiments, it should be understood that the invention as claimed should not be unduly limited to such specific embodiments.

What is claimed is:

1. A voltage controller for controlling AC power for a laser tube cathode heater, including:
    a switch control means for generating a control signal from a feedback signal and a reference voltage signal, wherein the control signal is timed to the AC power and has an amplitude indicative of the greater of the feedback signal and the reference voltage signal, and wherein the feedback signal is indicative of measured voltage at the laser tube cathode heater; and
    a switch connected to the laser tube cathode heater, for selectively supplying the AC power to the laser tube cathode heater in response to the control signal.

2. The voltage controller of claim 1, wherein the switch control means includes:
    a data signal generation means for generating a data signal by comparing the feedback signal with the reference voltage signal;
    a clock signal generation means for generating a clock signal in phase with the AC power; and
    a digital circuit for receiving the data signal and the clock signal, and generating the control signal therefrom.

3. The voltage controller of claim 1, wherein the digital circuit is a D-type flip-flop circuit.

4. The voltage controller of claim 1, wherein the laser tube cathode heater includes a transformer having a primary winding and a secondary winding, wherein the primary winding is connected to the switch and the secondary winding is connected to a laser tube cathode, said voltage controller also including:
    feedback signal generation means for generating the feedback signal by measuring voltage induced at the secondary winding by current flow through the primary winding.

5. The voltage controller of claim 4, wherein the switch control means includes:
    an RMS-to-DC converter means, including an integrating capacitor, for receiving the feedback signal from the feedback signal generation means and generating therefrom a DC signal representing time-averaged voltage induced at the secondary winding; and
    a comparator for comparing the DC signal with the reference voltage signal to generate a comparator output signal; and
    digital circuitry for generating the control signal from the comparator output signal.

6. The voltage controller of claim 1, wherein the AC power is AC line power having an RMS voltage substantially equal to 120 volts.

7. A voltage controller for controlling AC line power for a laser tube cathode heater, including:
    a switch control means for generating a control signal from a feedback signal and a reference voltage signal, wherein the control signal is in phase with the AC line power and has an amplitude indicative of the greater of the feedback signal and the reference voltage signal, and wherein the feedback signal is indicative of measured voltage at the laser tube cathode heater; and
    a solid state switch connected to the laser tube cathode heater, for selectively supplying AC line power to the laser tube cathode heater for full line cycle intervals in response to the control signal, thereby supplying substantially constant average power to the laser tube cathode heater despite variations in the AC line power.

8. The voltage controller of claim 7, wherein the AC line power is has an RMS voltage substantially equal to 120 volts.

9. The voltage controller of claim 7, wherein the laser tube cathode heater includes a transformer having a primary winding and a secondary winding, wherein the primary winding is connected to the solid state switch and the secondary winding is connected to a laser tube cathode, said voltage controller also including:
    feedback signal generation means for generating the feedback signal by measuring voltage induced at the secondary winding by current flow through the primary winding.

10. The voltage controller of claim 9, wherein the switch control means includes:
    an RMS-to-DC converter means, including an integrating capacitor, for receiving the feedback signal from the feedback signal generation means and generating therefrom a DC signal representing time-averaged voltage induced at the secondary winding; and
    a comparator for comparing the DC signal with the reference voltage signal to generate a comparator output signal; and
    digital circuitry for generating the control signal from the comparator output signal.

11. A gas laser system, including:
    a laser gas tube having a cathode;
    a laser tube cathode heater transformer, having a primary winding and a secondary winding, wherein the secondary winding is connected to the cathode;

a cathode heater power supply which receives AC power, and includes a switch control means for generating a control signal from a feedback signal and a reference voltage signal, wherein the control signal is in phase with the AC power and has an amplitude indicative of the greater of the feedback signal and the reference voltage signal, and wherein the feedback signal is indicative of voltage at the cathode, wherein the cathode power supply also includes a solid state switch connected to the primary winding for selectively supplying the AC power to said primary winding for full cycle intervals of the AC power in response to the control signal, thereby supplying substantially constant average power to the primary winding despite variations in the AC power.

12. The system of claim 11, wherein the AC power is AC line power having an RMS voltage substantially equal to 120 volts.

13. The system of claim 11, also including:
a sensing winding positioned near the primary winding, wherein the feedback signal is indicative of voltage induced across the sensing winding by current flow through the primary winding.

14. The system of claim 11, wherein the switch control means includes:
a data signal generation means for generating a data signal by comparing the feedback signal with the reference voltage signal;
a clock signal generation means for generating a clock signal in phase with the AC power; and
a digital circuit for receiving the data signal and the clock signal, and generating the control signal therefrom.

* * * * *